United States Patent [19]

Vishnevsky et al.

[11] 4,008,052
[45] Feb. 15, 1977

[54] METHOD FOR IMPROVING METALLURGICAL BOND IN BIMETALLIC CASTINGS

[75] Inventors: Constantine Vishnevsky, Solon; Lawrence D. Graham, North Canton, both of Ohio

[73] Assignee: TRW Inc., Cleveland, Ohio

[22] Filed: Apr. 30, 1975

[21] Appl. No.: 572,964

[52] U.S. Cl. .................................. 29/194; 148/32; 164/75; 164/100; 228/193
[51] Int. Cl.² .................................... B23P 3/00
[58] Field of Search .............. 228/193, 194; 29/191, 29/191.4, 194; 164/76, 100, 101, 102, 105, 93, 103, 106, 75; 148/3; 427/405

[56] References Cited

UNITED STATES PATENTS

| 3,260,505 | 7/1966 | Snyder | 29/183 |
| 3,279,006 | 10/1966 | Schwartz | 164/105 |
| 3,342,564 | 9/1967 | Schwartz | 29/183 |
| 3,496,630 | 2/1970 | Duff | 228/194 |
| 3,632,319 | 1/1972 | Hoppin | 228/194 |
| 3,711,936 | 1/1973 | Athey | 228/193 |
| 3,753,794 | 8/1973 | Paulonis | 29/194 |
| 3,820,961 | 6/1974 | Zelahy | 29/194 |

OTHER PUBLICATIONS

Duvall, et al.; *Welding Journal* Apr., 1974 pp. 203–214.
Chang, W. H.; *The Welding Journal Research Supplement* Sept. 1956, pp. 1–13.
Miller, F.; *The Tool and Manufacturing Engineer* Oct., 1963.
*Composition, Properties and Applications for Nicrobraz Brazing Filler Metals*, Wall Colmonoy Corp., 1972.
Hoppin, et al.; *Welding Research Supplement* Nov. 1970, pp. 505–509.

*Primary Examiner*—L. Dewayne Rutledge
*Assistant Examiner*—Michael L. Lewis

[57] ABSTRACT

Method for making a bicast article in which a solid metal preform is positioned in a mold and a molten metal is cast around portions of the preform which are exposed in the mold. In accordance with the present invention, the exposed portions are coated prior to the casting step with a boron containing alloy which is compatible with the preform and with the metal to be cast about it, the boron containing alloy having a melting range below the melting range of either the preform or the cast metal. The alloy also has a major ingredient which is the same as the major ingredient of at least one of the metals to be joined. After solidification of the molten metal in the casting cavity, the resulting bicast article is heat treated at a temperature below the melting range of either the preform or the solidified metal to cause diffusion of boron into the preform and into the solidified metal thereby providing an improved metallurgical bond.

14 Claims, 3 Drawing Figures

METHOD FOR IMPROVING METALLURGICAL BOND IN BIMETALLIC CASTINGS

BACKGROUND OF THE INVENTION

1. Field of the Invention

This invention is in the field of forming bicast metal structures by means of positioning a preform in a mold and casting the metal to be joined thereto about selected portions of the preform. The improvement of the present invention involves the use of an intermediate layer between the preform and the cast metal, said layer acting as an aid in bonding the two portions during casting and, by virtue of its special characteristics, further enhancing the strength of the bond after subsequent heat treatment.

2. Description of the Prior Art

Bimetallic casting processes, per se, have been described in prior art literature and patents. By and large these processes are directed to the production of a metallurgical bond between the preform and the metal which is cast about it. Reference is invited to Schwartz et al. U.S. Pat. Nos. 3,279,006 and 3,342,564 as examples of such disclosures. These patents describe the production of composite metallic objects by melting a metallic material having a specific property desired in the poured portion thereof under vacuum, heating a refractory mold having a cavity therein adapted to receive melted metallic material and having a solid metallic object or element positioned therein with at least a portion of the surface thereof exposed within the cavity, under vacuum and pouring the molten metallic material while maintaining an inert atmosphere. The bonding which exists between the solidified molten metal and the preform results from the interalloying of the preform with the poured metal to produce a metallurgically bonded zone.

While metallurgical bonding is an effective means for joining the two portions together into a bimetallic article, such bonds are difficult to achieve on a reliable and reproducible basis. In practice very high vacuum levels or other inert atmospheres must be used to prevent formation of contaminants at the interfacial region which can reduce the level of bonding. The temperatures of the pre-existing portion and the molten metal must be such that neither too rapid cooling of the cast-on metal occurs, which could reduce bond strength by preventing sufficient interalloying, or excessively slow cooling occurs, which could lead to gross melting of the initial solid portion. The physical contact occurring between the two materials being joined is characterized by extreme proximity, being aided not only by the capability of molten metal to fill even microscopic recesses in the initial solid portion but by the relatively greater contraction occurring in the cast-on material by virtue of its solidifying and subsequently cooling from a greater temperature than the initial solid material. The resulting physical contact precludes, except in the case of gross separation, the nondestructive inspection of the article for bond quality.

It has been found that mold preheating and casting conditions utilized to produce a bicast article can be such that regions showing metallurgical bonding and areas free of a metallurgical bond can both exist in the attachment region. If the design of the article for satisfactory operation in service relies exclusively on a metallurgical bond, undetectable areas of inadequate bonding can lead to premature failure.

Reference is made to the prior technical information published in the literature, (Article by U. Okapuu and G. S. Calvert entitled "An Experimental Cooled Radial Turbine" appearing in Agard Conference Proceedings No. 73 on High Temperature Turbines, Agard-CP-73-71, Paper No. 10, January, 1971) in which a gas turbine rotor was produced by bicasting a nickel-base superalloy hub around root areas of previously cast nickel-base superalloy blades. The design was based on achieving a metallurgical bond although a few small recesses were provided to yield some mechanical support. The root areas were tapered in a manner which, in the absence of the recesses and any metallurgical bond, would permit unrestricted removal of the blades from the hub portion. In practice use of vacuum preheating and pouring conditions based on prior controlled tests using castings which modeled the attachment resulted in the metallurgical bonding being limited to a single region of the root area. The resultant performance of the bimetallic part was not wholly adequate by virtue of failures from debonding at areas not fully bonded metallurgically.

The degree of bonding necessary to achieve the necessary degree of integrity in a metallurgical sense is such that a zone of alloying due to local intermelting or diffusion occurs without a discrete interface containing weakening constituents. Even the presence of a thin film of a weakening constituent having a thickness of only 0.00001 inch or even less can be sufficient to prevent bonding. In some metals and alloys, severe reductions in mechanical strength and ductility are known to occur from films only a few atomic layers thick between grains. These can arise from compositional impurities, improper metal working or casting procedures, heat treatments or various combinations of these.

SUMMARY OF THE INVENTION

The present invention provides a means for improving the metallurgical bond between the elements of a bicast structure produced from heat resistant materials while making process conditions less stringent. In the method of the present invention, a solid metal preform such as an airfoil having anisotropic metallurgical properties is given a coating of an alloy having a reduced melting point by virtue of the presence of small quantities of one or more elements, such as boron. The alloy used for the coating has a melting point below that of either the preform or the cast metal which is to be joined to it. The coating is applied under a vacuum or other suitable protective environment at a temperature just sufficient to achieve fusion to the preform surface and in a minimal period of time to avoid significant interalloying with the preform alloy.

Then, the coated preform is positioned in a mold having a casting cavity in the shape desired in the cast metal to be joined to the preform. The mold is heated in preparation for pouring in a vacuum environment to prevent contamination of the coating surface. Molten metal is poured under a vacuum into the casting cavity, solidifying around those portions of the preform in which a bond is desired. During casting the coating may undergo some degree of melting as the relatively hot cast metal transfers heat to the preform. Thus, bonding between the two materials is enhanced by the presence of the relatively lower melting point coating. Subsequent to casting, the bicast article, composed of the preform and cast-on metal and intermediate coating, is subjected to an elevated temperature heat treatment to effect additional bonding by causing a combination of remelting in the coating zone, diffusion of the melting point reducing element or elements out of the coating and into the adjacent alloys being joined, and diffusion of other elements into or out of the coating to improve compositional homogeneity. In the process, the melting point of the coating zone is substantially elevated by the lowering of the amount of the melting point reducing element or elements contained therein. The coating, which comprises the intermediate zone, functions as a brazing agent which can be selected to be compositionally sufficiently similar to the surrounding metal such that the resulting bond after heat treatment has mechanical properties approaching those of the surrounding metal.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 1:
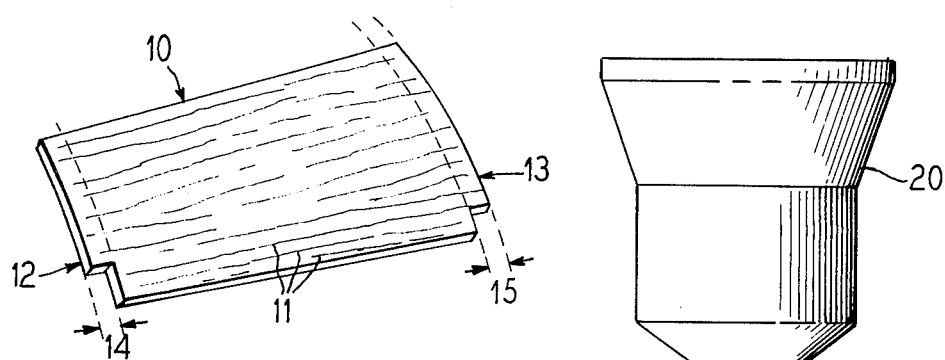
FIG. 1 is a view in perspective of a preform in the shape of an airfoil which is to be joined to two shrouds in the process of the present invention.

The process of the present invention is particularly applicable to the manufacturer of components for gas turbine engines produced from heat resistant alloys, particularly where the component has anisotropic metallurgical properties.

By "anisotropic metallurgical properties" we mean that the part has enhanced strength properties parallel to the major stress axis. In the case of an airfoil shape, this type of structure has been produced by directional solidification of a casting to provide columnar grains aligned parallel to the airfoil major axis. This grain orientation greatly improves resistance to intergranular fracture at elevated temperatures, and thus improves creep strength, ductility and particularly thermal-fatigue resistance.

Another material which evidences anisotropic metallurgical properties is a fiber reinforced metal matrix composite. Fibers such as boron, boron-silicon, or graphite are embedded in a metal matrix such as aluminum in the form of thin plies and the plies are laid up into the desired airfoil shape and then diffusion bonded together with the fibers running in the direction of the major stress axis. These composites exhibit highly directional, i.e., anisotropic properties, and can also be produced using combinations of heat resistant materials.

Still other examples of structures evidencing anisotropic metallurgical properties are directionally solidified eutectic alloys. These eutectic alloys solidify into lamellar or rod-like structures which resemble fiber reinforced composites in that a relatively strong rod or plate-like material reinforces the weaker matrix.

There are yet other examples of metallurgical structures which exhibit marked microstructural directionality and anisotropy of mechanical properties. Highly elongated and longitudinally aligned grains characteristic of high temperature alloys produced from consolidated metal powder by the so-called mechanical alloying process or by a process of directional recrystallization of wrought material are further examples of anisotropic metallurgical structures in the sense used in this invention.

There are inherent problems in producing articles having such anisotropic structures which are generally associated with changes in cross-section. For example, in cast high temperature blades or vanes used in gas turbines considerable difficulties can occur in producing the necessary article by the directional solidification process when large changes in geometry occur. The most abrupt and troublesome changes occur at the junctures of the airfoil portion and more massive attachment or root regions of blades, or so-called shrouds of vanes. These areas often display a propensity for internal defects referred to in the casting industry as shrinkage porosity and/or composition changes arising from changes in solidification rates. In addition, the ledges formed by the root areas or shrouds can serve as traps for nonmetallic impurities such as inclusions or dross.

In the case of blades and vanes the directionally aligned, anisotropic, cast structure is desired generally in the airfoil portion of the article which is the region exposed to the most severe temperature and stress environment. The nature of the casting process is such, however, that the entire article is cast by the directional solidification process which for complex parts unduly adds to the difficulties of producing the article needed to meet the functional requirements dictated by service conditions.

Still other configurations exist in which the geometrical limitations are such that production of directionally solidified airfoil portions is difficult. One example is found in unitary cast turbine wheels consisting of a disc or hub portion supporting a plurality of airfoils on the rim. Such wheels can be produced in cast form with an equiaxed cast grain structure using the investment casting process. The resulting product will exhibit essentially that type of cast grain microstructure in the airfoil and disc portion and the properties will be more or less isotropic. Although the size of grains may vary somewhat, no preferred alignment or anisotropy will exist in the longitudinal direction of the airfoils. In commercial practice the problem of achieving a wheel with directionally solidified airfoils is approached by assembling the wheel from separately cast blades mechanically attached to the rim of a separately produced disc having equiaxed grains, usually formed by a forging process. Slots machined in the rim of the disc serve to anchor the roots of the individual blades. This type of assembly is extremely expensive in comparison with a unitary casting. However, its commercial use serves to illustrate the desirability of selectively employing anisotropic metallurgical structures and combining these with other metallurigical structures in an overall article such as a turbine wheel.

In the preferred form of the present invention, a preform is made up having anisotropic metallurgical properties and then the portions of the preform which are to be joined to the cast metal are coated with an alloy containing boron to lower its melting point relative to the preform and alloy to be cast, the coating alloy being compatible with both the preform and the solidified molten metal. Depending on the degree of strength required in the metallurgical bond to be achieved by the process of this invention, the composition of the coating alloy can be varied in relation to that of the preform and cast-on metal, with the exception of the amount of boron which will be substantially greater than in the preform or the solidified metal.

For example, if two materials of substantially similar superalloy composition are to be used in the respective preform and cast-on metal portions with a high degree of strength required in the bond, the coating alloy composition can be selected to closely approximate that of the adjacent alloys. However, where the strength of the metallurgical bond need not closely approximate the strength of the preform or cast-on metal, such as in the case of components subjected in service to relatively light loads, we prefer a relatively simple coating alloy which resembles the alloys being joined in terms of a few major chemical constituents. In either case, the major ingredient of the coating should be the same as the major ingredient of at least one of the metals to be joined.

As an example, where the preform and the solidified metal joined to it are both nickel-base alloys, we prefer to use an alloy of predominantly nickel composition, with chromium in the range of 5 to 25%, 0.05 to 0.2% carbon, and about 1 to 4% boron to achieve a reduction of the melting point. A particularly preferred boron containing alloy is one having about 15% chromium, about 3.5% boron, about 0.1% carbon, and the balance nickel. This alloy has a melting point of about 1930° F, the melting point being lower than that of either of the two superalloys which are to be joined. The nickel-base superalloys, for example, have melting points extending from about 2250° to 3000° F.

The boron containing alloy can be coated onto the preform by any of a variety of processes, including electroplating, vapor deposition, or application in the form of a spray, powder or paste. If either of the two latter methods of application are used, the alloy should be fused to the coated areas to provide a continuous film of the boron containing alloy. The application of the coating is preferably conducted in a vacuum or other protective environment to aid in bonding it to the preform. The specific environment can be varied to meet the requirements of the preform alloy and coating composition and, for example, could, in addition to a vacuum, include in some cases a hydrogen atmosphere or argon gas. To those familiar with the art of furnace brazing it will be apparent that selection of an improper environment for fusing the coating will result in readily visible poor flow and poor wetting of the coating to the preform and suggest a proper corrective change in procedure.

Similarly, the temperatures at which the coating is fused may be varied depending on the coating alloy. For the specific coating alloy cited earlier we have found a fusion temperature of 1950° F in conjunction with a vacuum environment to produce the desired coating fusion and adhesion to the preform in a period of five minutes at the fusion temperature. In general, the coating alloy, regardless of its composition, must be applied at the lowest possible temperature and shortest period of time to avoid reducing its boron content through diffusion to the preform and hence raising its melting point.

The dimensions of the coating zone after fusion will from the nature of the deposition techniques tend to be small. We prefer to limit the coating thickness to less than 0.005 inch.

In FIG. 1, reference numeral 10 has been applied generally to a preform having anisotropic metallurgical properties, in this case, an airfoil having columnar grains generally indicated at reference numeral 11, the grains extending along the major stress axis of the airfoil. At the opposite ends of the airfoil 10 are a pair of extensions 12 and 13 arranged to anchor the airfoil in the subsequently applied metal casting by means of a metallurgical bond. The areas to which the boron containing alloy coating is to be pre-applied on the airfoil 10 are in zones denoted 14 and 15 which encompass the extensions 12 and 13.

Figure 2:
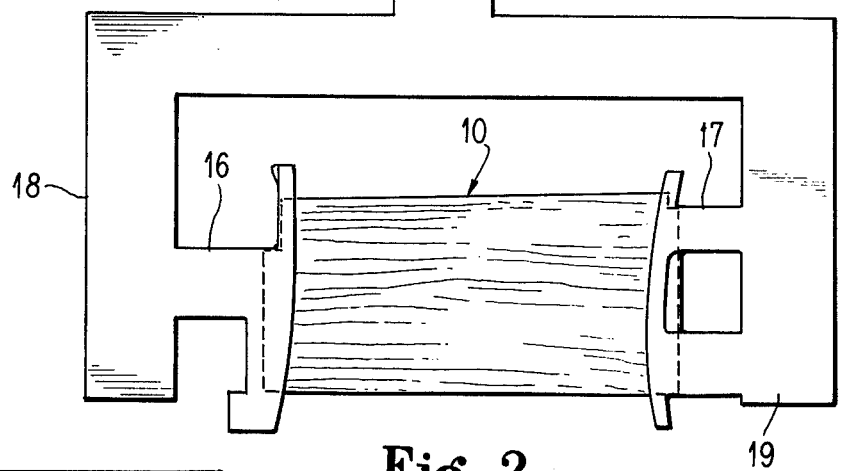
FIG. 2 is a view in elevation showing how the preform of FIG. 1 is received in a wax pattern assembly for the production of the investment casting mold.

A disposable pattern assembly is then built up as illustrated in FIG. 2. The airfoil 10 is supported between two replicas 16 and 17 of the shrouds between which the airfoil 10 is to be bonded. The pattern may be made of wax, polystyrene or mixtures of the two. The shroud patterns 16 and 17 are connected to riser forming portions 18 and 19, respectively, which are fed from a sprue forming portion 20 all composed of the disposable pattern material.

As previously noted, the airfoil portion 10 may be made of any suitable material having anisotropic metallurgical properties. Directionally solidified alloys of nickel and cobalt are particularly useful for this purpose. The chemistry of these alloys has been well developed over the years and does not form a specific feature of the present invention. For a disclosure of such chemistry and other properties of nickel and cobalt base superalloys, reference is invited to Table 1 appearing in the appendix of the work entitled "The Superalloys" edited by Sims et al., and published by John Wiley & Sons. Table 1, appearing at pages 596 to 597 lists many commercial nickel and cobalt base superalloys, and that disclosure is incorporated herein by reference.

The assembly shown in FIG. 2 is then subjected to the usual investment mold making process. While there are a number of ways to produce shell molds of this type, we particularly prefer to use the method described in Mellen et al. U.S. Pat. No. 2,932,864 issued Apr. 19, 1960. In the method described in that patent, a destructible pattern of the article to be reproduced is coated at room temperature by dipping it in an aqueous slurry containing refractory particles and a binder. This coating is then dried isothermally so that the temperature of the pattern remains constant. The drying is achieved by passing air of controlled humidity past the coated pattern, the air containing sufficient moisture to maintain a substantially constant wet bulb temperature which is substantially the same as the initial temperature of the pattern and having a dry bulb temperature which is at least 10° F higher than the wet bulb temperature. The pattern is then dipped in additional aqueous refractory slurries to form successive layers on the pattern. Each successive layer is isothermally dried in the same manner as described previously while maintaining the temperature of the pattern substantially constant. Finally, the pattern is removed by melting it out either in a furnace or in an autoclave.

Figure 3:
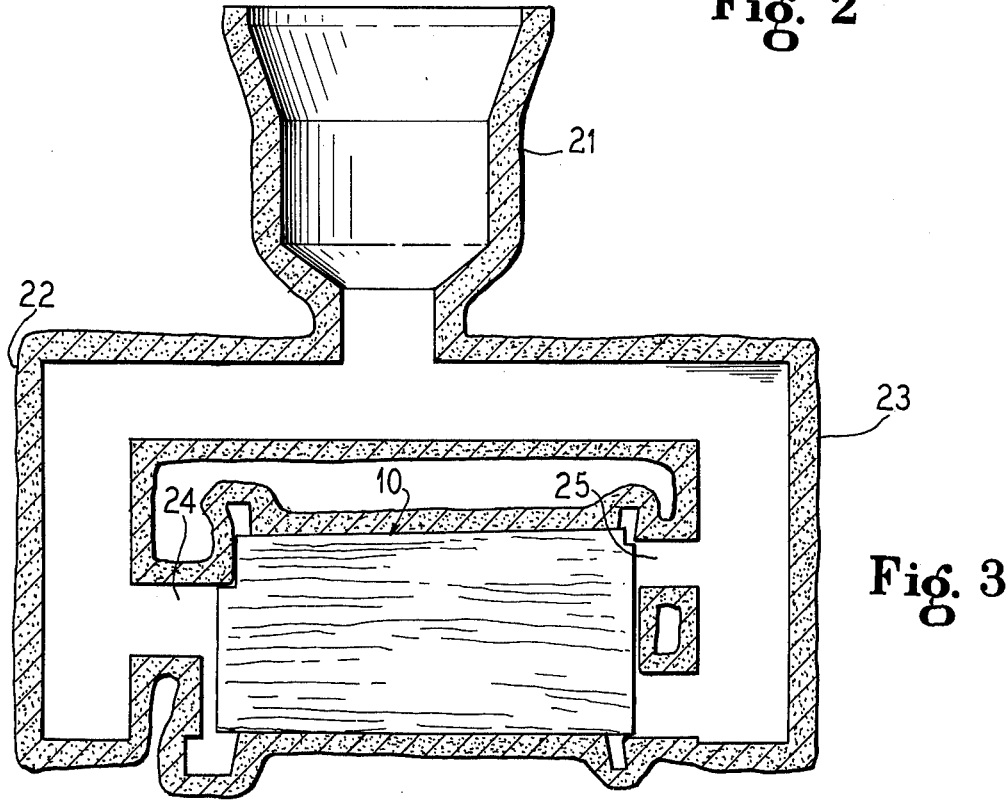
FIG. 3 is a view of the assembly after the investment casting mold has been formed around the pattern and the pattern has been removed to produce a casting cavity for the reception of molten metal.

The mold which results is illustrated in FIG. 3 of the drawings. It contains a sprue portion 21 feeding a pair of riser portions 22 and 23 which feed a pair of casting cavities 24 and 25 which are to form the shrouds of the airfoil assembly.

In the preferred embodiment of the present invention, the mold incorporating the coated preform is preheated prior to casting at a temperature of about 1600° F in a vacuum and then the mold is ready to receive the cast metal melted and poured under a vacuum. One of the features of the present invention resides in the fact that the molten metal can be poured at a relatively low temperature, i.e., under conditions which would normally produce only mechanical bonding, since melting of the boron containing coating is not required at this stage.

After the cast metal has solidified, the bicast article is removed from the mold and is subjected to a heat treatment sufficient to cause migration of the boron from the intermediate layer into both the preform and the solidified molten metal. Generally, the heat treatment can be carried out at temperatures of about 1850° to 2250° F with a range of 2050° to 2175° F being preferred. The heat treatment is preferably carried out under inert conditions, such as a vacuum of 10 to 15 microns. The time of heat treatment can vary substantially, as it might be as short as one-half hour and may extend as long as 20 hours or more. During this heat treatment, the migration of boron from the intermediate layer raises the melting temperature of the layer. The diffusion of the boron also serves to enhance the bond which is achieved.

An analysis of the intermediate area indicates that there are no abrupt compositional changes occurring across the width of the area, so that the intermediate area has physical properties very substantially similar to those of the surrounding areas, particularly if the composition of the boron containing coating was selected to closely match that of the alloys being joined.

It has also been observed that the casting in the immediate vicinity of the interface with the intermediate layer evidences relatively small columnar grains which are perpendicular to the interface between the two superalloys by virtue of the heat extracted by the relatively cold preform.

While boron represents the particularly preferred diffusion agent for improving the bond, it is also possible to incorporate substantial amounts of silicon in the intermediate layer, ranging from about 2 to 8%. Silicon, however, diffuses rather slowly into the surrounding metal. Phosphorous in an amount of 1 to 4% can also be used as an ingredient in the bonding layer, but not with as great effect as provided by boron.

The process of the present invention thus secures improved metallurgical bonding without the necessity of depending on interfacial melting during casting to achieve a metallurgical bond. The diffusion of the boron under the heat treatment conditions results in a stable compositional condition at the interface, resulting in a substantial similarity between the bonding region and the adjacent solid preform and cast-on portions. Consequently, the bond which results can exhibit mechanical properties approaching those of the superalloys being joined.

It should be evident that various modifications can be made to the described embodiments without departing from the scope of the present invention.

We claim as our invention:

1. In the method of making a bicast article in which a solid metal preform is positioned in a mold and a molten metal is cast about the portions of said preform exposed in said mold, the improvement which comprises coating said exposed portions prior to the casting step with a boron containing alloy having a melting range below the melting range of either said preform or said cast metal, fusing said alloy into said preform without significant interalloying with the metal preform, said alloy having a major ingredient the same as the major ingredient of at least one of the metals to be joined, and heat treating the resulting bicast article after solidification of the molten metal at a temperature below the melting range of either said preform or the solidified metal to cause diffusion of boron into the preform and into the solidified metal.

2. The method of claim 1 in which said preform has anisotropic metallurgical properties.

3. The method of claim 1 in which said preform has an elongated grain structure.

4. The method of claim 1 in which said preform consists of a directionally solidified casting having a columnar grained structure.

5. The method of claim 1 in which said preform is a directionally solidified casting of substantially eutectic composition.

6. The method of claim 1 in which said preform consists of a composite having a fiber reinforced metal matrix.

7. The method of claim 1 in which said preform is substantially of an airfoil geometry.

8. The method of claim 1 in which said preform is composed of a nickel base superalloy.

9. The method of claim 1 in which said preform is composed of a cobalt base superalloy.

10. The method of claim 1 in which said boron containing alloy is a nickel base alloy.

11. The method of claim 1 in which said heat treatment is carried out at a temperature in the range from 1850° to 2250° F.

12. The method of claim 1 in which said boron containing alloy contains between 1 and 4% by weight boron.

13. The method of claim 1 in which said boron containing alloy contains from 5 to 25% chromium, 1 to 4% boron, 0.05 to 0.2% carbon, and the balance substantially nickel.

14. A composite metallic article comprising a first nickel base superalloy bonded to a second nickel base superalloy through an intermediate bonding zone of a nickel base alloy containing boron, both said first and second nickel base superalloys having boron diffused therein from said bonding zone, and the interface between said first and second superalloys with said bonding zone being characterized by small columnar grains extending perpendicular to said interface.

* * * * *

UNITED STATES PATENT OFFICE
CERTIFICATE OF CORRECTION

Patent No. 4,008,052        Dated February 15, 1977

Inventor(s) Constantine Vishnevsky and Lawrence D. Graham

It is certified that error appears in the above-identified patent and that said Letters Patent are hereby corrected as shown below:

Column 8, line 15, delete "interalloying with" and add --penetration into--.

Column 8, line 18, after "joined," insert --casting said molten metal against the thus coated preform, solidifying the cast metal against said preform,--

Signed and Sealed this

Third Day of May 1977

[SEAL]

Attest:

RUTH C. MASON
*Attesting Officer*

C. MARSHALL DANN
*Commissioner of Patents and Trademarks*